(No Model.)
S. R. BRICK.
GAS CONDUIT.
No. 327,996. Patented Oct. 13, 1885.
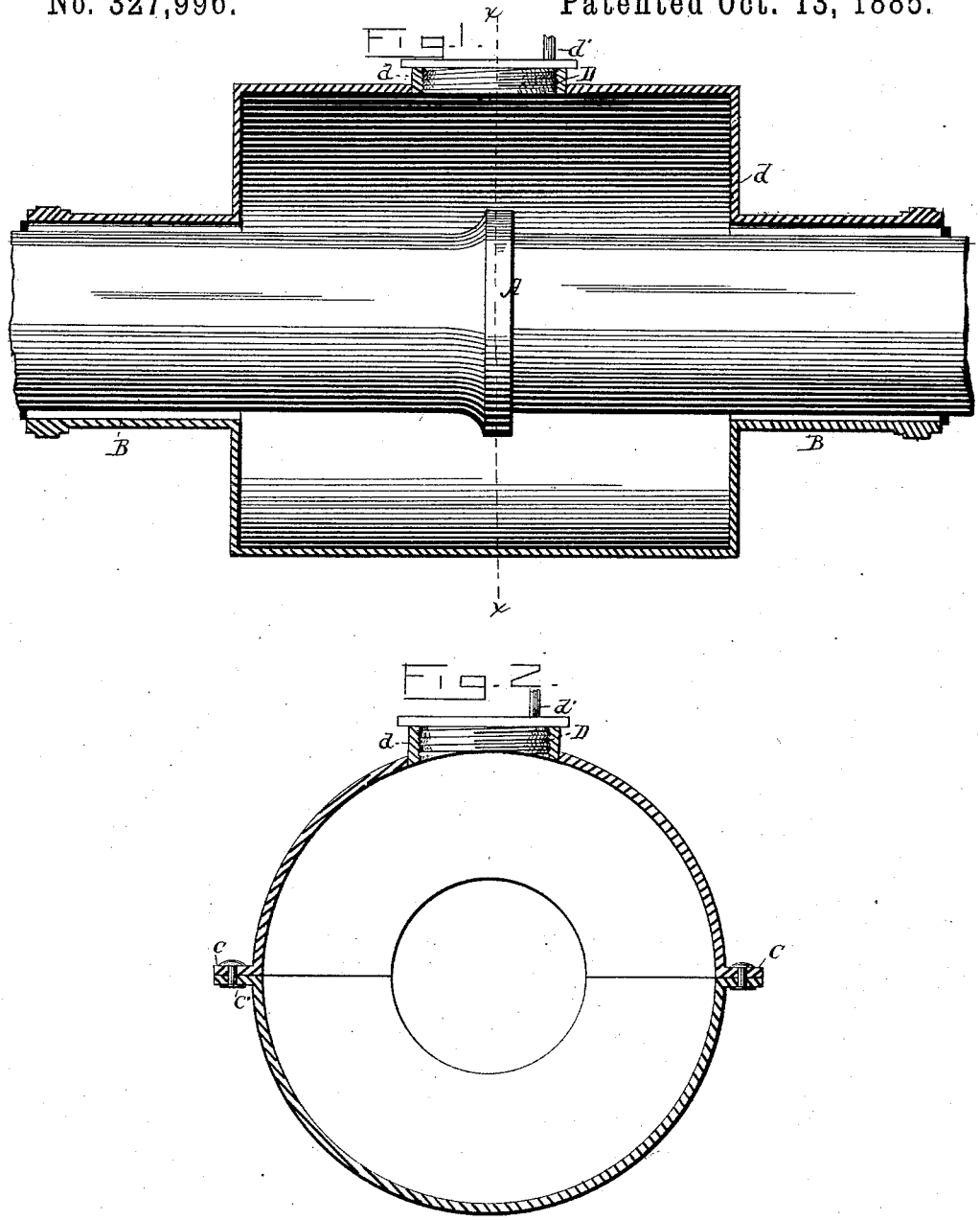

UNITED STATES PATENT OFFICE.

SAMUEL R. BRICK, OF STAPLETON, NEW YORK.

GAS-CONDUIT.

SPECIFICATION forming part of Letters Patent No. 327,996, dated October 13, 1885.

Application filed June 13, 1885. Serial No. 168,617. (No model.)

*To all whom it may concern:*

Be it known that I, SAMUEL R. BRICK, a citizen of the United States, and a resident of Stapleton, county of Richmond, State of New York, have invented certain new and useful Improvements in Casings for Gas-Conduits, of which the following is a specification.

My invention relates to gas mains or conduits; and it consists of an outer casing, surrounding the joints of the pipes or mains, one casing being connected by means of a small pipe to the next casing, and so on till several casings are thus connected, when the gas escaping into such casings is discharged by means of one of the small pipes eccentrically located in the man-hole and terminating at the surface of the street or other suitable place, where the gas may be discharged without danger or inconvenience.

On August 28, 1883, I took out Letters Patent No. 283,962, for "improvement in safety gas-tanks for vessels," in which I showed a casing surrounding a gas-tank or gasometer. My idea then was to apply—by changing the form—my safety gas-tank to conduits, substantially as in said patent shown, in connection with gas-tanks—that is to say, by incasing the conduit or main in a continuous casing provided at different points with vent or flue pipes for carrying off and discharging the gas escaping into such casing. By careful experiment and investigation I found that while such device was novel and possessed many valuable advantages over anything theretofore used, it was expensive, and, under certain conditions, somewhat inconvenient, (as, for example, where a connection had to be made with the inner pipe,) and also that the escape of gas generally occurs at the points where the sections of the pipes are joined, and that by incasing those portions of the pipes escaping gas would be arrested, and by providing such casings with flue-pipes or connecting several of them with small pipes, and allowing one of the small pipes to terminate at the surface of the street or other convenient point of discharge, the same effect would be attained as is effected by the continuous casing. Besides being cheaper, this system of casing is more convenient, and does not interfere with ready access to the main for the purpose of making connections, owing to my arrangement of the escape-pipe and man-hole.

My improved casing is cast in two semicircular sections, that, when placed together, form a round casing, larger in diameter than the joint to be covered, joined together by passing bolts through the corresponding flanges of both sections, both ends of each section having a semicircular projection, smaller in diameter than the main body of the casing, being adapted to fit tightly over and half-way around the conduit, meeting and fitting tightly against a corresponding section.

In the accompanying drawings, Figure 1 is a view of one-half (or one section) of the casing, showing the interior. Fig. 2 is a cross-section of my casing, the two sections bolted together on the line $x\ x$ of Fig. 1.

A is one casting of my casing, concaved so as to form a semicircle, having the projections B similarly concaved, but of smaller diameter, adapted to fit around the gas-conduit, and flanges $c$, with holes $c'$, to receive a bolt and nut passing through the flanges of both sections of the case. The top section of the case is provided with the thread-hole D, into which is screwed the T-boss $d$.

The two sections of the case should fit perfectly, and the flange of each exactly register with the corresponding flange of the other casting.

My improved case is applied to the conduit as follows: After the sections of the conduit are joined together the two castings of the case are brought together, so that the flange or lap of the joint of the conduit is incased in the body A of the casing, and the neck B of the casing will fit tightly around the conduit. The two castings are then secured together by bolts passing through the flanges and held by nuts or otherwise secured.

There should be a packing of mill-board and red lead, or other suitable packing, between the conduit and neck B and between the flanges to make the casing gas-tight. After the casing is placed around the joints of the conduits, as described, two or more of the casings are connected together by securing the pipes in the casing and providing the boss with the exhaust or flue pipe $d'$, terminating at the surface of the street or other suitable place of discharge, and arranged eccentrically in the hole D and its cover, so as to afford space for the insertion of the hand in cleaning operations.

What I claim is—

In apparatus for preventing the injurious effects due to leakage of gas, the casing A, consisting of counterpart halves adapted to encircle an ordinary gas-pipe at its connections, having ends B B, of smaller diameter, in order to effect a close and inexpensive joint, the upper part of said casing having a threaded central man-hole, D, to accommodate the T-boss $d$, in which an atmospheric exhaust-pipe, $d'$, is eccentrically disposed, in combination with such gas-pipe, as and for the purpose shown and described.

In testimony that I claim the foregoing as my invention I have signed my name, in presence of two witnesses, this 2d day of March, 1885.

SAM. R. BRICK.

Witnesses:
J. A. SAEMLI,
WM. P. KOOKOGY.